(12) United States Patent
Tetaz et al.

(10) Patent No.: US 12,351,139 B2
(45) Date of Patent: Jul. 8, 2025

(54) SYSTEM AND A METHOD (71) Applicant: COMPAGNIE GENERALE DES ETABLISSEMENTS MICHELIN, Clermont-Ferrand (FR)

(72) Inventors: Pierre-Alexis Tetaz, Tokyo (JP); Mathieu Grandemange, Tokyo (JP); Remi Bouard, Tokyo (JP); Yves Potin, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/271,346

(22) PCT Filed: Jan. 8, 2021

(86) PCT No.: PCT/JP2021/000453
§ 371 (c)(1),
(2) Date: Jul. 7, 2023

(87) PCT Pub. No.: WO2022/149255
PCT Pub. Date: Jul. 14, 2022

(65) Prior Publication Data
US 2024/0067140 A1 Feb. 29, 2024

(51) Int. Cl.
*B60S 5/04* (2006.01)
*B60C 99/00* (2006.01)

(52) U.S. Cl.
CPC .............. *B60S 5/04* (2013.01); *B60C 99/003* (2013.01)

(58) Field of Classification Search
CPC .......... B60S 5/04; B60C 99/003; B60C 25/05
See application file for complete search history.

(56) References Cited

U.S. PATENT DOCUMENTS

| | | | |
|---|---|---|---|
| 3,077,743 A | 2/1963 | Castro et al. | |
| 3,599,694 A | 8/1971 | Bezbatchenko, Jr. | |
| 3,675,699 A | 7/1972 | Ocone | |
| 3,708,006 A | 1/1973 | King | |
| 3,921,688 A | 11/1975 | Tsuruta | |
| 4,343,338 A * | 8/1982 | Hart | B60C 23/18 |
| | | | 165/41 |
| 7,137,417 B2 | 11/2006 | Kroll et al. | |
| 7,174,925 B2 | 2/2007 | Fritz, II | |

(Continued)

FOREIGN PATENT DOCUMENTS

| | | | | |
|---|---|---|---|---|
| EP | 3081444 A1 | 10/2016 | | |
| EP | 3789217 A1 * | 3/2021 | ........... | B60C 99/003 |

(Continued)

OTHER PUBLICATIONS

International Search Report dated Sep. 21, 2021, in corresponding PCT/JP2021/000453 (2 pages).

*Primary Examiner* — Patrick C Williams
(74) *Attorney, Agent, or Firm* — VENABLE LLP (57) ABSTRACT

A device for preventing excessive increase of an internal pressure of a rolling assembly, the rolling assembly having a rotation axis and comprising a wheel and a tire, the tire being mounted onto the wheel creating an inner cavity surrounded by a wheel internal surface and a tire internal surface, comprises a cold spot placed in the inner cavity of the rolling assembly for condensing vapor contained in a gas filled in the inner cavity.

16 Claims, 5 Drawing Sheets

(56) References Cited

U.S. PATENT DOCUMENTS

| | | |
|---|---|---|
| 8,108,099 B2 | 1/2012 | Sawada et al. |
| 2008/0066533 A1* | 3/2008 | Beverly ............ B60C 23/00372 |
| | | 73/146 |
| 2010/0235044 A1 | 9/2010 | Sawada et al. |
| 2018/0065426 A1 | 3/2018 | Yurjevich et al. |
| 2019/0143765 A1* | 5/2019 | Richardson ........... B60C 23/004 |
| | | 152/419 |
| 2021/0001674 A1* | 1/2021 | Stuckey ................. B60B 21/02 |
| 2024/0051357 A1 | 2/2024 | Tetaz et al. |

FOREIGN PATENT DOCUMENTS

| | | |
|---|---|---|
| FR | 366926 | 10/1906 |
| JP | 2006-23084 A | 1/2006 |
| KR | 10-2005-0070594 A | 7/2005 |
| KR | 10-1957198 B1 | 3/2019 |
| WO | 2005/035277 A1 | 4/2005 |
| WO | 2005/084967 A1 | 9/2005 |
| WO | 2007/105427 A1 | 9/2007 |
| WO | 2009/004585 A1 | 1/2009 |

* cited by examiner

SYSTEM AND A METHOD

TECHNICAL FIELD

The present invention relates generally to preparing a rolling assembly before usage and in particular to a system and method for preparing a rolling assembly before usage of the rolling assembly.

BACKGROUND ART

An internal pressure is a key element for performance of a pneumatic tire, in terms of endurance, grip, handling, etc., in particular for competition use, and it is important to predict the internal pressure during "hot" usage situation for competitiveness of the pneumatic tire. Physically, the internal pressure of a gas filled in an inner cavity of the pneumatic tire increases with temperature for a given volume according to the combined gas law (PV/T=constant, where P is the pressure, V is the volume and T is the temperature), which is expected to be linear.

In real usage situation, other mechanisms intervene the internal pressure not to increase linearly with the temperature, and presence of humidity contained in the gas filled in the inner cavity is one of such the mechanism causing overpressure which leads degradation of tire performance during usage.

A temperature of tire components is also the key element for performance of a rolling assembly including a tire for ensuring desired adhesion of the rolling assembly on ground.

In order to minimize excessive increase of the internal pressure during usage at preparation of the rolling assembly, it is known that introducing a dried gas into the inner cavity of the rolling assembly is effective. And to increase the temperature of tire components to an operating temperature at preparation of the rolling assembly, it is known that using a tire warmer is effective. Various solutions have been proposed to minimize excessive increase of the internal pressure during usage at preparation of the rolling assembly, and to increase the temperature of tire components to the operating temperature at preparation of the rolling assembly.

U.S. Pat. No. 7,137,417 discloses an apparatus for inflating and purging a tire with clean dry air or gas comprising a four way valve, a gas input assembly, a vacuum generator and an article interface assembly.

WO2009/004585 discloses a tire warmer comprising a body wrappable to the wheel at the tire and seating a resistor for heating the tire, and the resistor is connected to electrical supply means actuable by a control device connected to a temperature sensor associable to the tread of the tire, and the tire warmer comprises a regulating device of the pressure of gas contained by the tire.

CITATION LIST

Patent Literature

[PTL 1]
U.S. Pat. No. 7,137,417
[PTL 2]
WO2009/004585

However with the solutions disclosed in these documents, it is still difficult to eliminate completely the humidity in the inner cavity and since the amount of the humidity contained in the gas filled in the inner cavity is small compared to those during "hot" usage, effectiveness and efficiency for decreasing the humidity is not satisfactory. Moreover with the solutions disclosed in these documents, since the tire warmer warms outer circumference of the tire or the rolling assembly, a tire internal construction is still not at desired temperature even outer circumference, in particular a tread reaches to such the temperature, or outer circumference, in particular the tread is heated too much when the tire internal construction reaches to its desired temperature, or duration necessary for preparing the rolling assembly becomes too long. Thus there is a desire to have a system and a method enables to solve the problem related to humidity contained in the gas to be filled in the inner cavity and to warming whole the rolling assembly within a reasonable duration.

Therefore, there is a need for a system and a method enables to solve the problem related to humidity contained in the gas to be filled in the inner cavity and to warming whole the rolling assembly within a reasonable duration.

It is thus an object of the invention to provide a system and a method that provide improvement on excessive increase of internal pressure during usage and on warming up whole the rolling assembly simultaneously at preparation.

SUMMARY OF INVENTION

The present invention provides a system for preparing a rolling assembly before usage, the rolling assembly having a rotation axis and comprising a wheel and a tire, the tire being mounted onto the wheel creating an inner cavity surrounded by a wheel internal surface and a tire internal surface, the system comprising a circulator for circulating a gas in the inner cavity, a dryer for drying the gas to be circulated in the inner cavity, an intake mean for introducing the gas to be circulated in the inner cavity and an exhaust mean for exhausting the gas circulated in the inner cavity and for guiding the gas exhausted to the circulator or to the dryer.

The present invention also provides a method for preparing a rolling assembly before usage, the rolling assembly having a rotation axis and comprising a wheel and a tire, the tire being mounted onto the wheel creating an inner cavity surrounded by a wheel internal surface and a tire internal surface, the method comprising a step for drying a gas to be circulated in the inner cavity, a step for circulating the gas dried, a step for introducing the gas to be circulated in the inner cavity, a step for exhausting the gas introduced and circulated in the inner cavity and a step for guiding the gas exhausted to a mean for circulating or for drying the gas.

The present invention further provides a method for preparing at least two rolling assemblies simultaneously before usage, each the rolling assembly having a rotation axis and comprising a wheel and a tire, the tire being mounted onto the wheel creating an inner cavity surrounded by a wheel internal surface and a tire internal surface, the method comprising a step for drying a gas to be circulated in the inner cavity, a step for circulating the gas dried, a step for introducing the gas to be circulated in the inner cavity of one rolling assembly, a step for circulating the gas circulated in one rolling assembly to another rolling assembly, a step for exhausting the gas introduced and circulated in the inner cavities of the at least two rolling assemblies and a step for guiding the gas exhausted to a mean for circulating or for drying the gas.

These arrangements provide an improvement on excessive increase of internal pressure during usage and on warming up whole the rolling assembly simultaneously at preparation.

Since the system comprises the dryer for drying the gas to be circulated in the inner cavity, the gas to be circulated in the inner cavity (that will become the gas filled in the inner cavity after completion of preparation) via the circulator through the intake mean is dried to eliminate the humidity contained in the gas to be circulated in the inner cavity. Therefore it is possible to improve excessive increase of internal pressure during usage.

Also at the same time, since the dryer warms the gas dried and to be circulated in the inner cavity during its drying process, the rolling assembly will be warmed up from inside (inner cavity side) while further eliminating the humidity contained in the gas to be circulated in the inner cavity. Therefore it is possible to improve excessive increase of internal pressure during usage while warming whole the rolling assembly.

Since the gas dried, circulated in the inner cavity and exhausted through the exhaust mean is guided to the circulator or to the dryer, the dried, circulated and exhausted gas is dried again for further elimination of the humidity contained in the gas to be circulated and to be warmed again, then recirculated in the inner cavity. Therefore it is possible to improve further excessive increase of internal pressure during usage while warming further the rolling assembly simultaneously within a reasonable duration.

As for the method, since the method comprising the step for drying the gas to be circulated in the inner cavity, the gas to be circulated in the inner cavity (that will become the gas filled in the inner cavity after completion of preparation) is dried to eliminate the humidity contained in the gas. Therefore it is possible to improve excessive increase of internal pressure during usage.

Also at the same time, since the step for drying the gas to be circulated in the inner cavity warms the gas dried then introduced into the inner cavity through the step for circulating the gas dried and the step for introducing the gas to be circulated in the inner cavity, the rolling assembly will be warmed up from inside (inner cavity side). Therefore it is possible to warm whole the rolling assembly.

Since the step for exhausting the gas introduced and circulated in the inner cavity exhausts the dried, introduced and circulated gas in the inner cavity then the step for guiding the gas exhausted to the mean for circulating or for drying the gas enables the dried, circulated and exhausted gas being dried again for further elimination of the humidity contained in the gas to be circulated and to be warmed again, and recirculated in the inner cavity. Therefore it is possible to improve further excessive increase of internal pressure during usage while warming further the rolling assembly simultaneously within a reasonable duration.

When the method comprises the step for introducing the gas to be circulated in the inner cavity of one rolling assembly, the step for circulating the gas circulated in one rolling assembly to another rolling assembly and the step for exhausting the gas introduced and circulated in the inner cavities of the at least two rolling assemblies, the inner cavities of the at least two rolling assemblies can be considered as one single connected cavity. Therefore it is possible to prepare the at least two rolling assemblies improved on excessive increase of internal pressure during usage while warming within a reasonable duration simultaneously.

In another preferred embodiment, the intake mean and the exhaust mean are placed coaxially, and the gas to be circulated in the inner cavity is introduced and is exhausted through a valve hole provided on the wheel.

According to this arrangement, as the introduction and exhaust of the gas to be circulated/circulated would be made through one single valve hole provided on the wheel, it is possible to use conventional rim thus efficiency for preparing the rolling assembly would be increased.

In another preferred embodiment, the wheel is provided with at least two valve holes, and the intake mean and the exhaust mean are connected to different valve holes.

According to this arrangement, it is possible to effectively and efficiently circulate/recirculate the gas dried thus efficiency for preparing the rolling assembly would further be increased.

In another preferred embodiment, the system further comprises a connecting mean connecting between the inner cavity of one rolling assembly and the inner cavity of another rolling assembly.

According to this arrangement, it is further possible to effectively and efficiently prepare the rolling assembly as this enables to prepare a plurality of rolling assemblies at the same time by creating virtually one single inner cavity consisting of the plurality of different inner cavities connected via the connecting mean.

In another preferred embodiment, the system further comprises a heating blanket wrapped around an outer circumference of the rolling assembly.

According to this arrangement, it is further possible to effectively and efficiently prepare the rolling assembly as the heating blanket wrapped around the outer circumference of the rolling assembly warms the rolling assembly from outside, and warming energy transmitted from outside of the rolling assembly contributes to further warming of the gas dried circulating the inner cavity while further eliminating humidity contained in the circulating gas thanks for additional warming energy provided by the heating blanket.

In another preferred embodiment, the system further comprises a heating mean for heating the gas dried or the gas to be dried.

According to this arrangement, it is possible to reduce the time necessary for preparing the rolling assembly as the gas dried or to be dried is further warmed via the heating mean contributing both faster warming up of the rolling assembly and further elimination of humidity still contained in the gas dried or to be dried.

In another preferred embodiment, the dryer is a heating oven capable to store the rolling assembly inside of the dryer.

According to this arrangement, it is possible to prepare efficiently the rolling assembly as the heating oven is capable to store a plurality of rolling assemblies even without means to connect the inner cavity of different rolling assemblies while warming the rolling assembly from both inside and outside of the rolling assembly. Preferably the plurality of rolling assemblies stored in the heating oven are connected with means to connect the inner cavity of different rolling assemblies.

In another preferred embodiment, at least one of the intake mean or the exhaust mean further comprises a tap for shutting the gas circulation off.

According to this arrangement, it is further possible to efficiently prepare the rolling assembly as the tap for shutting the gas circulation off makes it possible to keep the rolling assembly "ready to use" without extra balancing or pressure adjusting process.

In another preferred embodiment, the method further comprises a step for heating an outer circumference of the rolling assembly.

According to this arrangement, it is further possible to effectively and efficiently prepare the rolling assembly as the step for heating the outer circumference of the rolling assembly enables not only to warm the rolling assembly from outside but also to transmit warming energy from outside of the rolling assembly for extra warming of the gas circulating the inner cavity while further eliminating humidity contained in the circulating gas.

In another preferred embodiment, the method further comprises a step for heating the gas dried or the gas to be dried.

According to this arrangement, it is possible to reduce the time necessary for preparing the rolling assembly as the step for heating the gas dried or to be dried further contributes both faster warming up of the rolling assembly and further elimination of humidity still contained in the gas dried or to be dried.

In another preferred embodiment, the method further comprises a step for storing the rolling assembly inside of a heating oven.

According to this arrangement, it is possible to prepare efficiently the rolling assembly as the step for storing the rolling assembly inside of the heating oven enables to store a plurality of rolling assemblies without means to connect the inner cavity of different rolling assemblies while warming the rolling assembly from both inside and outside of the rolling assembly.

Advantageous Effects of Invention

According to the arrangements described above, it is possible to provide an improvement on excessive increase of internal pressure during usage and on warming up whole the rolling assembly simultaneously at preparation.

BRIEF DESCRIPTION OF DRAWINGS

Other characteristics and advantages of the invention arise from the description made hereafter in reference to the annexed drawings which show, as nonrestrictive examples, the embodiment of the invention.

In these drawings.

DESCRIPTION OF EMBODIMENTS

Preferred embodiments of the present invention will be described below referring to the drawings.

Figure 1:
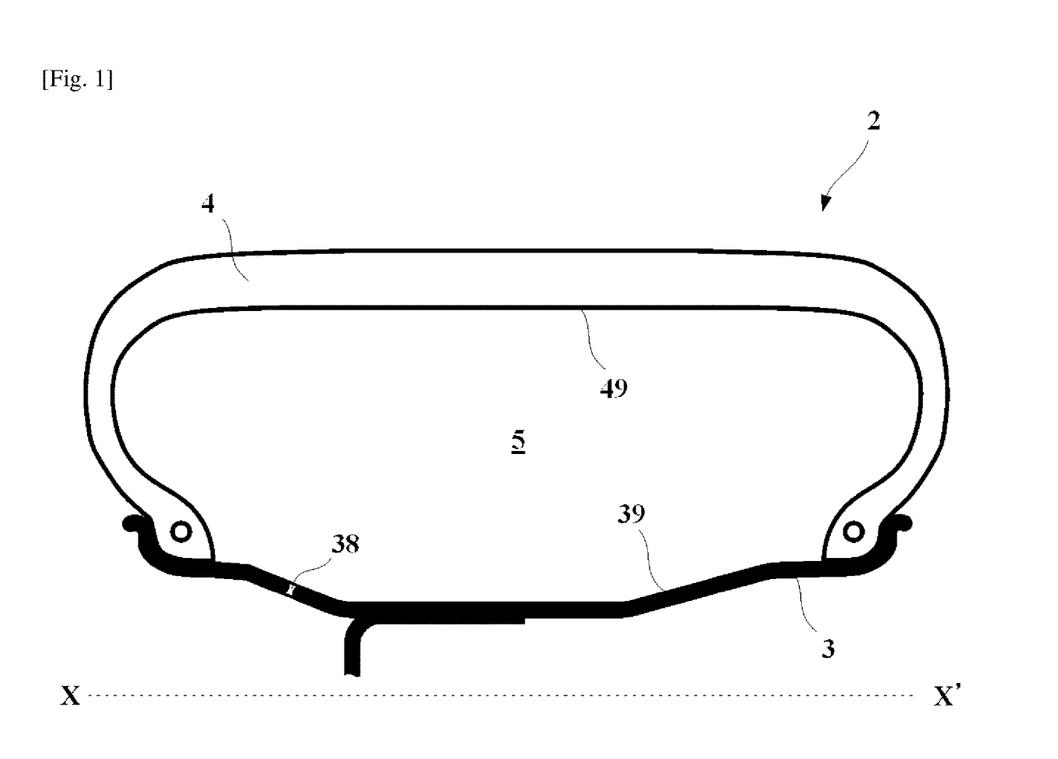
FIG. 1 is a schematic sectional view of a rolling assembly according to a first embodiment of the present invention.
Figure 2:
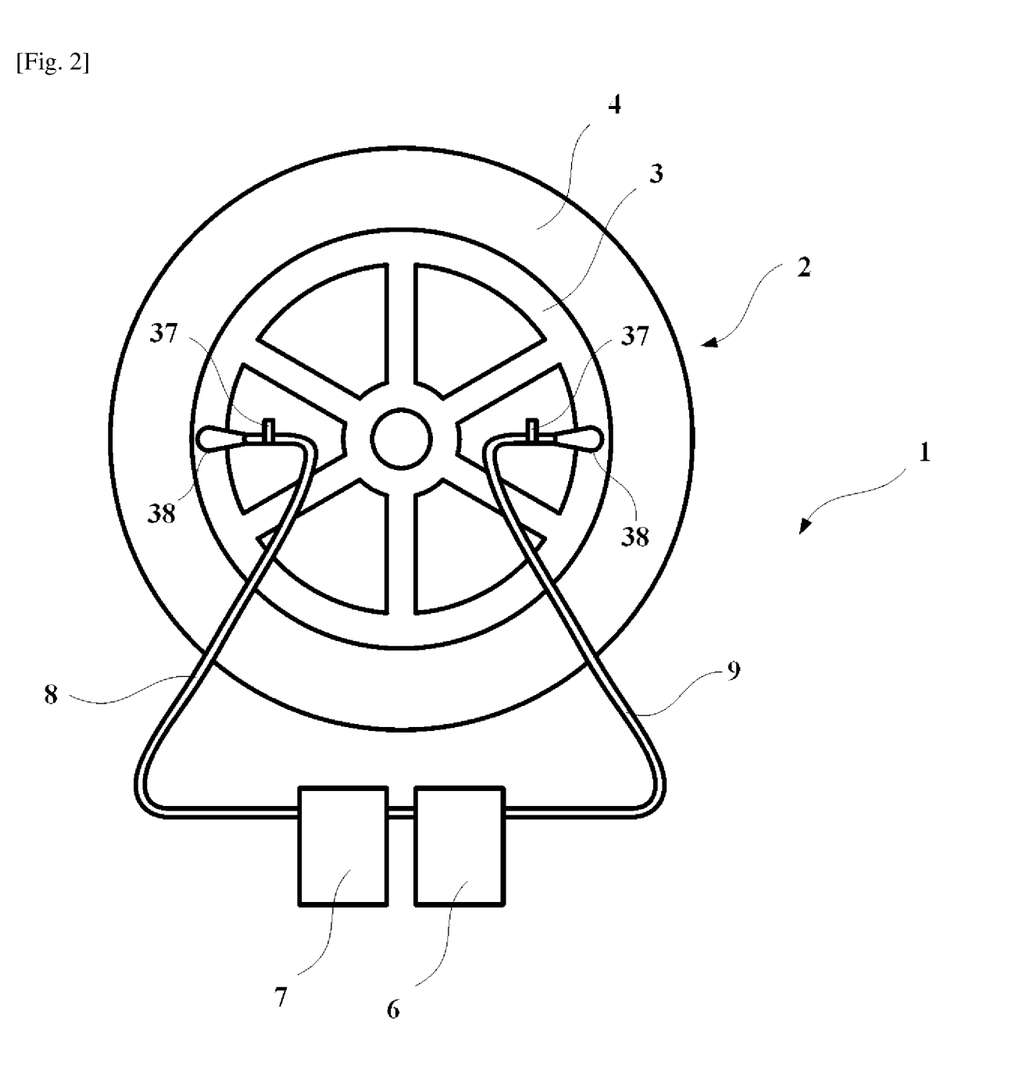
FIG. 2 is a schematic plan view of a system according to the first embodiment of the present invention.

A system 1 according to a first embodiment of the present invention will be described referring to FIGS. 1 and 2. FIG. 1 is a schematic sectional view of a rolling assembly according to a first embodiment of the present invention. FIG. 2 is a schematic plan view of a system according to the first embodiment of the present invention.

The system 1 is a system for preparing a rolling assembly 2 before usage of the rolling assembly 2. The rolling assembly 2 having a rotation axis X-X' and comprising a wheel 3 and a tire 4, the tire 4 being mounted onto the wheel 3 creating an inner cavity 5 surrounded by a wheel internal surface 39 and a tire internal surface 49. The wheel 3 is provided with a valve hole 38 connecting the inner cavity 5 and the air outside of the rolling assembly 2, and where a valve (not shown) will be affixed.

As shown in FIG. 2, the system 1 comprises a circulator 6 for circulating a gas in the inner cavity 5 (shown in FIG. 1), a dryer 7 for drying the gas to be circulated in the inner cavity 5, an intake mean 8 for introducing the gas to be circulated in the inner cavity 5 and an exhaust mean 9 for exhausting the gas circulated in the inner cavity 5 and for guiding the gas exhausted to the circulator 6 or to the dryer 7.

As shown in FIG. 2, the wheel 3 is provided with at least two valve holes 38, and the intake mean 8 and the exhaust mean 9 are connected to different valve holes 38, and at least one of the intake mean 8 or the exhaust mean 9 further comprises a tap 37 for shutting the gas circulation off. In this present embodiment, the wheel 3 is provided with 2 valve holes 38 180 degrees diagonally around the rotation axis, and both the intake mean 8 and the exhaust mean 9 comprise the tap 37.

Since the system 1 comprises the dryer 7 for drying the gas to be circulated in the inner cavity 5, the gas to be circulated in the inner cavity 5 (that will become the gas filled in the inner cavity 5 after completion of preparation) via the circulator 6 through the intake mean 8 is dried to eliminate the humidity contained in the gas to be circulated in the inner cavity 5. Therefore it is possible to improve excessive increase of internal pressure during usage.

Also at the same time, since the dryer 7, also known as dehumidifier, warms the gas dried and to be circulated in the inner cavity 5 during its drying process, the rolling assembly 2 will be warmed up from inside (inner cavity side) while further eliminating the humidity contained in the gas to be circulated in the inner cavity 5. Therefore it is possible to improve excessive increase of internal pressure during usage while warming whole the rolling assembly 2.

Since the gas dried, circulated in the inner cavity 5 and exhausted through the exhaust mean 9 is guided to the circulator 6 or to the dryer 7, the dried, circulated and exhausted gas is dried again for further elimination of the humidity contained in the gas to be circulated and to be warmed again, then recirculated in the inner cavity 5. Therefore it is possible to improve further excessive increase of internal pressure during usage while warming further the rolling assembly 2 simultaneously within a reasonable duration.

Since the wheel 3 is provided with at least two valve holes 38, and the intake mean 8 and the exhaust mean 9 are connected to different valve holes 38, it is possible to effectively and efficiently circulate/recirculate the gas dried thus efficiency for preparing the rolling assembly 2 would further be increased.

Since at least one of the intake mean 8 or the exhaust mean 9 further comprises a tap 37 for shutting the gas circulation off, it is further possible to efficiently prepare the rolling assembly 2 as the tap 37 for shutting the gas circulation off makes it possible to keep the rolling assembly 2 "ready to use" without extra balancing or pressure adjusting process.

The circulator 6 and the dryer 7 may be placed in reversed order, or may be integrated into one single apparatus.

The intake mean 8 and/or the exhaust mean 9 may be connected to a mean possible to keep the internal pressure of the rolling assembly 2, e.g. a valve.

At least two valve holes 38 of the wheel 3 may be provided diagonally with an angle other than 180 degrees around the rotation axis.

As for a method when preparing the rolling assembly 2 with the system 1 according to the first embodiment of the present invention, the method comprises a step for drying a gas to be circulated in the inner cavity 5, a step for circulating the gas dried, a step for introducing the gas to be circulated in the inner cavity 5, a step for exhausting the gas introduced and circulated in the inner cavity 5 and a step for guiding the gas exhausted to a mean for circulating or for drying the gas.

Since the method comprising the step for drying the gas to be circulated in the inner cavity 5, the gas to be circulated in the inner cavity 5 (that will become the gas filled in the inner cavity after completion of preparation) is dried to eliminate the humidity contained in the gas. Therefore it is possible to improve excessive increase of internal pressure during usage.

Also at the same time, since the step for drying the gas to be circulated in the inner cavity 5 warms the gas dried then introduced into the inner cavity 5 through the step for circulating the gas dried and the step for introducing the gas to be circulated in the inner cavity 5, the rolling assembly 2 will be warmed up from inside (inner cavity side). Therefore it is possible to warm whole the rolling assembly 2.

Since the step for exhausting the gas introduced and circulated in the inner cavity 5 exhausts the dried, introduced and circulated gas in the inner cavity 5 then the step for guiding the gas exhausted to the mean for circulating or for drying the gas enables the dried, circulated and exhausted gas being dried again for further elimination of the humidity contained in the gas to be circulated and to be warmed again, and recirculated in the inner cavity 5. Therefore it is possible to improve further excessive increase of internal pressure during usage while warming further the rolling assembly 2 simultaneously within a reasonable duration.

Figure 3:
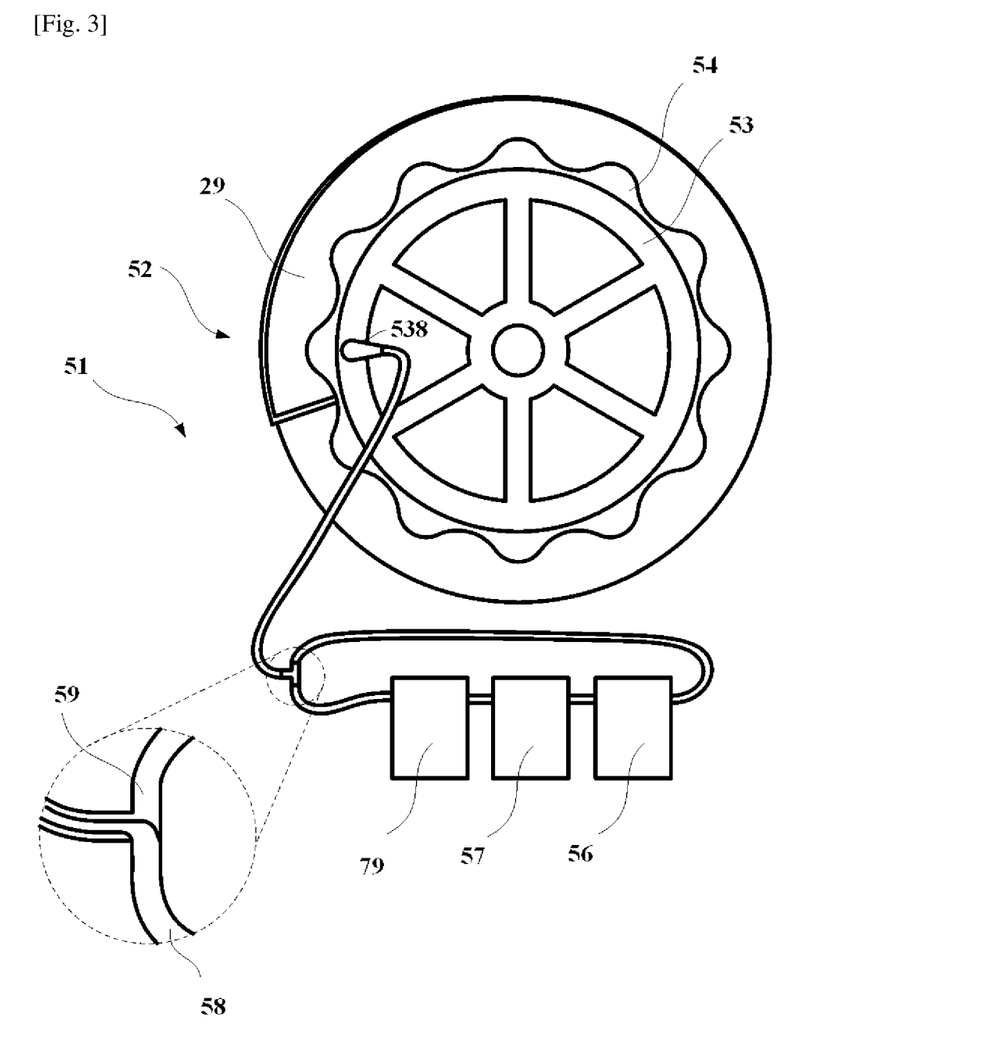
FIG. 3 is a schematic plan view of a system according to a second embodiment of the present invention.

A system 51 according to a second embodiment of the present invention will be described referring to FIG. 3. FIG. 3 is a schematic plan view of a system according to a second embodiment of the present invention. The construction of this second embodiment is similar to that of the first embodiment other than the arrangement shown in FIG. 3, thus description will be made referring to FIG. 3.

As shown in FIG. 3, the intake mean 58 and the exhaust mean 59 of the system 51 are placed coaxially, and the gas to be circulated in the inner cavity (not shown) is introduced and is exhausted through a valve hole 538 provided on a wheel 53. The intake mean 58 is placed inside of the exhaust mean 59 in coaxial manner, both extending to the valve hole 538.

As shown in FIG. 3, the system 51 further comprises a heating blanket 29 wrapped around an outer circumference of a rolling assembly 52 comprising the wheel 53 and a tire 54.

As shown in FIG. 3, the system 51 further comprises, other than a circulator 56 and a dryer 57, a heating mean 79 for heating the gas dried or the gas to be dried.

Since the intake mean 58 and the exhaust mean 59 are placed coaxially, and the gas to be circulated in the inner cavity is introduced and is exhausted through a valve hole 538 provided on the wheel 53, it is possible to use conventional rim thus efficiency for preparing the rolling assembly 52 would be increased, as the introduction and exhaust of the gas to be circulated/circulated would be made through one single valve hole 538 provided on the wheel 53.

Since the system 51 further comprises a heating blanket 29 wrapped around an outer circumference of the rolling assembly 52, it is further possible to effectively and efficiently prepare the rolling assembly 52 as the heating blanket 29 wrapped around the outer circumference of the rolling assembly 52 warms the rolling assembly 52 from outside, and warming energy transmitted from outside of the rolling assembly 52 contributes to further warming of the gas dried circulating the inner cavity while further eliminating humidity contained in the circulating gas thanks for additional warming energy provided by the heating blanket 29.

Since the system 51 further comprises a heating mean 79 for heating the gas dried or the gas to be dried, it is possible to reduce the time necessary for preparing the rolling assembly 52 as the gas dried or to be dried is further warmed via the heating mean 79 contributing both faster warming up of the rolling assembly 52 and further elimination of humidity still contained in the gas dried or to be dried.

The circulator 56, the dryer 57 and the heating mean 79 may be integrated into one single apparatus all together, or any of these two apparatuses may be integrated into one single apparatus.

The heating blanket 29 may be any type known for those in the art.

As for a method when preparing the rolling assembly 52 with the system 51 according to the second embodiment of the present invention, the method further comprises a step for heating an outer circumference of the rolling assembly 52, and a step for heating the gas dried or the gas to be dried.

Since the method further comprises the step for heating the outer circumference of the rolling assembly 52, it is further possible to effectively and efficiently prepare the rolling assembly 52 as the step for heating the outer circumference of the rolling assembly 52 enables not only to warm the rolling assembly 52 from outside but also to transmit warming energy from outside of the rolling assembly 52 for extra warming of the gas circulating the inner cavity while further eliminating humidity contained in the circulating gas.

Since the method further comprises the step for heating the gas dried and the gas to be dried, it is possible to reduce the time necessary for preparing the rolling assembly 52 as the step for heating the gas dried or to be dried further contributes both faster warming up of the rolling assembly 52 and further elimination of humidity still contained in the gas dried or to be dried.

Figure 4:
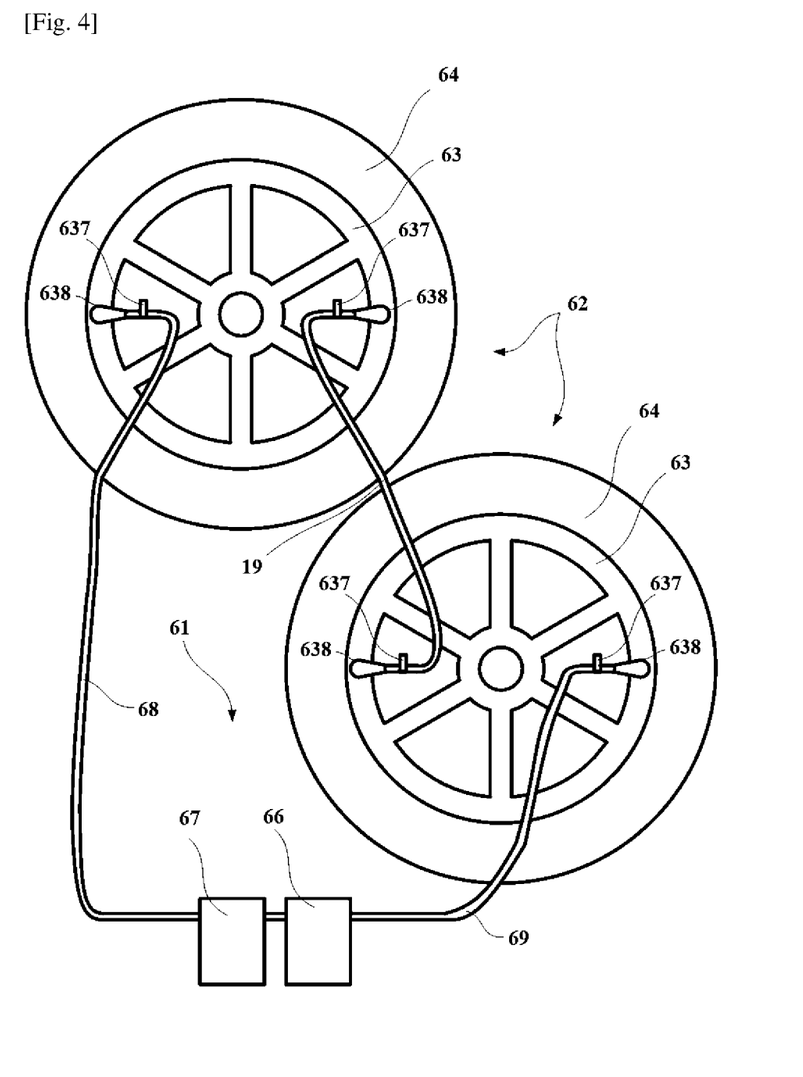
FIG. 4 is a schematic plan view of a system according to a third embodiment of the present invention.

A system 61 according to a third embodiment of the present invention will be described referring to FIG. 4. FIG. 4 is a schematic plan view of a system according to a third embodiment of the present invention. The construction of this third embodiment is similar to that of the first and the second embodiments other than the arrangement shown in FIG. 4, thus description will be made referring to FIG. 4.

As shown in FIG. 4, the system 61 comprises a circulator 66 and a dryer 67 for preparing a plurality of rolling assemblies 62 each comprising a wheel 63 and a tire 64, the wheel 63 of each the rolling assembly 62 is provided with two valve holes 638. A gas dried will be introduced to one rolling assembly 62 through one valve hole 638 of the wheel 63 via an intake mean 68 provided with a tap 637 for shutting the gas circulation off. The gas dried and circulated will be exhausted from another rolling assembly 62 through one valve hole 638 of the wheel 63 via an exhaust mean 69 also provided with the tap 637. The system 61 further comprises a connecting mean 19 connecting between an inner cavity (not shown) of one rolling assembly 62 and an inner cavity (not shown) of another rolling assembly 62. The connecting mean 19 connects the inner cavity of different rolling assemblies 62 through the valve hole 638 of the wheel 63 where the intake mean 68 is not attached and through the valve hole 638 of another wheel 63 where the exhaust mean 69 is not attached.

Since the system 61 further comprises the connecting mean 19 connecting between the inner cavity of one rolling assembly 62 and the inner cavity of another rolling assembly 62, it is further possible to effectively and efficiently prepare the rolling assembly 62 as this enables to prepare the plurality of rolling assemblies 62 at the same time by creating virtually one single inner cavity consisting of the plurality of different inner cavities connected via the connecting mean 19.

As for a method when preparing the rolling assembly 62 with the system 61 according to the third embodiment of the present invention, the method comprises a step for introducing the gas to be circulated in the inner cavity of one rolling assembly, a step for circulating the gas circulated in one rolling assembly to another rolling assembly, a step for exhausting the gas introduced and circulated in the inner cavities of the at least two rolling assemblies.

Figure 5:
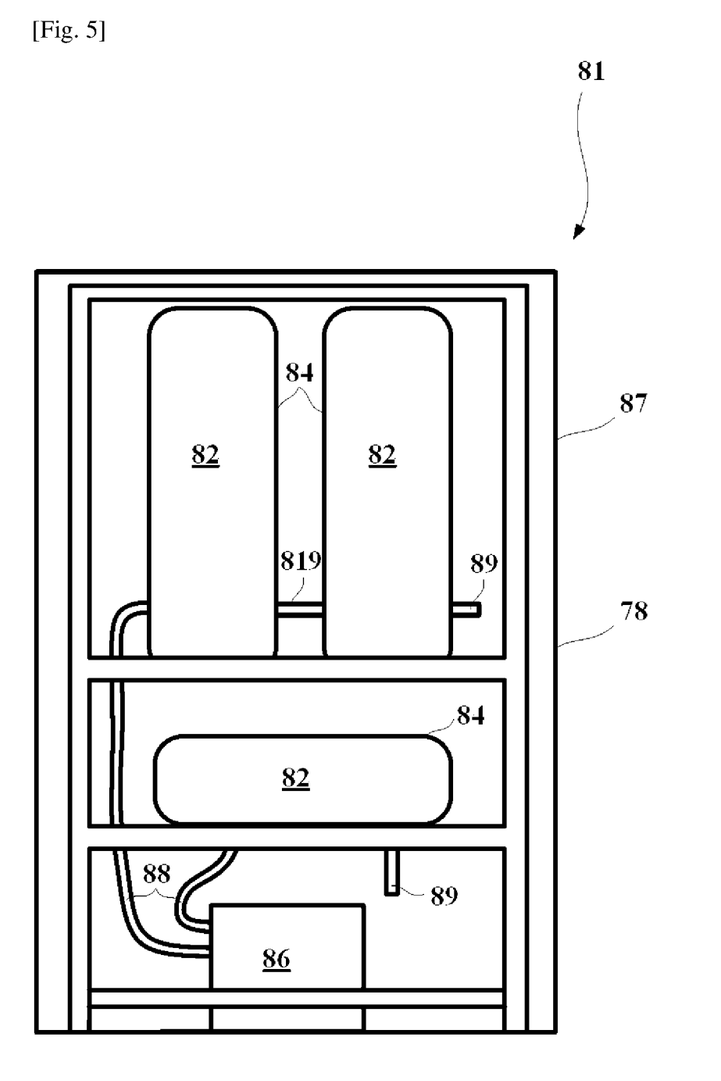
FIG. 5 is a schematic plan view of a system according to a fourth embodiment of the present invention.

A system 81 according to a fourth embodiment of the present invention will be described referring to FIG. 5. FIG. 5 is a schematic plan view of a system according to a fourth embodiment of the present invention. The construction of this fourth embodiment is similar to that of the first, second and the third embodiments other than the arrangement shown in FIG. 5, thus description will be made referring to FIG. 5.

As shown in FIG. 5, the system 81 comprises a circulator 86 and a dryer 87 for preparing a plurality of rolling assemblies 82 each comprising a wheel (not shown) and a tire 84, the wheel of each the rolling assembly 82 is provided with two valve holes (not shown).

As shown in FIG. 5, the dryer 87 is a heating oven 78 capable to store the rolling assembly 82 inside of the dryer 87. The heating oven 78 is heated from inside of the heating oven 78, or from outside of the heating oven 78. In this present embodiment, the dryer 87/the heating oven 78 is capable to store three rolling assemblies 82 inside of the dryer 87, in a flat manner and/or in a vertical manner.

As shown in FIG. 5, the gas dried will be introduced into the rolling assembly 82 via the circulator 86 through an intake mean 88, and will be exhausted through an exhaust mean 89. Two rolling assemblies 82 stored upper side of the dryer 87 is connected via a connecting mean 819. The connecting mean 819 connects inner cavities (not shown) of two different rolling assemblies 82 enable to circulate the gas dried from one rolling assembly 82 to another rolling assembly 82.

Since the dryer 87 is the heating oven 78 capable to store the rolling assembly 82 inside of the dryer 87, it is possible to prepare efficiently the rolling assembly 82 as the heating oven 78 is capable to store a plurality of rolling assemblies 82 even without means to connect the inner cavity of different rolling assemblies 82 while warming the rolling assembly 82 from both inside and outside of the rolling assembly 82. Preferably the plurality of rolling assemblies 82 stored in the heating oven 78 are connected with means to connect the inner cavity of different rolling assemblies 82 (connecting mean 819).

The system 81 may comprise dryer(s) 87 other than the heating oven 78 for drying specifically the gas circulated/to be circulated in the inner cavity(ies) of the rolling assembly(ies) 82.

As for a method when preparing the rolling assembly 82 with the system 81 according to the fourth embodiment of the present invention, the method comprises a step for storing the rolling assembly 82 inside of a heating oven 78.

Since the method comprises a step for storing the rolling assembly 82 inside of a heating oven 78, it is possible to prepare efficiently the rolling assembly 82 as the step for storing the rolling assembly 82 inside of the heating oven 78 enables to store a plurality of rolling assemblies 82 without means to connect the inner cavity of different rolling assemblies 82 while warming the rolling assembly 82 from both inside and outside of the rolling assembly 82.

The invention is not limited to the examples described and represented and various modifications can be made there without leaving its framework.

REFERENCE SIGNS LIST

1, 51, 61, 81 system
19, 819 connecting mean
2, 52, 62, 82 rolling assembly
29 heating blanket
3, 53, 63 wheel
37, 637 tap
38, 538, 638 valve hole
39 wheel internal surface
4, 54, 64, 84 tire
49 tire internal surface
5 inner cavity
6, 56, 66, 86 circulator
7, 57, 67, 87 dryer
78 heating oven
79 heating mean
8, 58, 68, 88 intake mean
9, 59, 69, 89 exhaust mean

The invention claimed is:

1. A system for preparing a rolling assembly before usage, the rolling assembly having a rotation axis and comprising a wheel and a tire, the tire being mounted onto the wheel creating an inner cavity surrounded by a wheel internal surface and a tire internal surface, the system comprising:
   a circulator for circulating a gas in the inner cavity;
   a dryer for drying the gas to be circulated in the inner cavity;
   an intake mean for introducing the gas to be circulated in the inner cavity; and
   an exhaust mean for exhausting the gas circulated in the inner cavity and for guiding the gas exhausted to the circulator and to the dryer.

2. The system according to claim 1, wherein the intake mean and the exhaust mean are placed coaxially, and
   wherein the gas to be circulated in the inner cavity is introduced and is exhausted through a valve hole provided on the wheel.

3. The system according to claim 1, wherein the wheel is provided with at least two valve holes, and
   wherein the intake mean and the exhaust mean are connected to different valve holes.

4. The system according to claim 3, wherein the system further comprises a connecting mean connecting the inner cavity of one rolling assembly and the inner cavity of another rolling assembly.

5. The system according to claim 1, wherein the system further comprises a heating blanket wrapped around an outer circumference of the rolling assembly.

6. The system according to claim 1, wherein the system further comprises a heating mean for heating the gas dried or the gas to be dried.

7. The system according to claim 1, wherein the dryer is a heating oven capable of storing the rolling assembly inside of the dryer.

8. The system according to claim 1, wherein at least one of the intake mean or the exhaust mean further comprises a tap for shutting the gas circulation off.

9. A method for preparing a rolling assembly before usage, the rolling assembly having a rotation axis and comprising a wheel and a tire, the tire being mounted onto the wheel creating an inner cavity surrounded by a wheel internal surface and a tire internal surface, comprising:
- a step for drying a gas to be circulated in the inner cavity;
- a step for circulating, using a circulator, the gas after the gas is dried;
- a step for introducing the gas to be circulated in the inner cavity;
- a step for exhausting the gas introduced and circulated in the inner cavity; and a step for guiding the gas exhausted to the circulator and a mean for drying the gas.

10. The method according to claim 9, wherein the method further comprises a step for heating an outer circumference of the rolling assembly.

11. The method according to claim 9, wherein the method further comprises a step for heating the gas dried or the gas to be dried.

12. The method according to claim 9, wherein the method further comprises a step for storing the rolling assembly inside of a heating oven.

13. A method for preparing at least two rolling assemblies simultaneously before usage, each the rolling assembly having a rotation axis and comprising a wheel and a tire, the tire being mounted onto the wheel creating an inner cavity surrounded by a wheel internal surface and a tire internal surface, comprising:
- a step for drying a gas to be circulated in the inner cavity;
- a step for circulating, using a circulator, the gas after the gas is dried;
- a step for introducing the gas to be circulated in the inner cavity of one rolling assembly;
- a step for circulating the gas circulated in one rolling assembly to another rolling assembly;
- a step for exhausting the gas introduced and circulated in the inner cavities of the at least two rolling assemblies; and
- a step for guiding the gas exhausted to the circulator and a mean for drying the gas.

14. The method according to claim 13, wherein the method further comprises a step for heating an outer circumference of the rolling assembly.

15. The method according to claim 13, wherein the method further comprises a step for heating the gas dried or the gas to be dried.

16. The method according to claim 13, wherein the method further comprises a step for storing the rolling assembly inside of a heating oven.

* * * * *